United States Patent [19]

Isaac

[11] Patent Number: 5,000,459

[45] Date of Patent: Mar. 19, 1991

[54] GOLF BALL COVER

[75] Inventor: Sharon R. Isaac, Acushnet, Mass.

[73] Assignee: Acushnet Company, New Bedford, Mass.

[21] Appl. No.: 375,748

[22] Filed: Jul. 5, 1989

[51] Int. Cl.$^5$ .............................................. A63B 37/12
[52] U.S. Cl. ................................ 273/235 R; 525/201; 260/998.14; 524/908
[58] Field of Search .................... 524/908; 273/235 R; 525/201; 260/998.14

[56] References Cited

U.S. PATENT DOCUMENTS

| | | |
|---|---|---|
| 3,264,272 | 8/1966 | Rees . |
| 3,454,280 | 7/1969 | Harrison . |
| 3,819,768 | 6/1974 | Molitor . |
| 4,323,247 | 4/1982 | Keches et al. ................... 273/235 R |
| 4,508,309 | 4/1985 | Brown . |
| 4,567,219 | 1/1986 | Tominaga et al. .................. 524/408 |

OTHER PUBLICATIONS

E. I. Du Pont de Nemours & Co., Inc., "Ionomer Blends for Golf Ball Covers", Research Disclosure #27103, Kenneth Mason Publications Ltd., Nov. 1986.

E. I. Du Pont de Nemours & Co., Inc., "Golf Balls Based on Lithium Ionomers or Blends with Lithium Ionomers", Research Disclosure #27221, Kenneth Mason Publications, Ltd., Dec. 1986.

*Primary Examiner*—Allan M. Liberman
*Attorney, Agent, or Firm*—Lucas & Just

[57] ABSTRACT

The golf ball cover is made from about 90 to about 50 parts by weight of a lithium ionomer resin and about 10 to about 40 parts by weight sodium ionomer resin. The cover has excellent durability.

17 Claims, No Drawings

GOLF BALL COVER

The present invention relates to golf balls and, more particularly, to golf ball covers made from a lithium ionomer resin wherein up to about 50% by weight of the lithium ionomer resin has been replaced with one or more sodium ionomer resins without having a deleterious effect on durability.

Generally, there are three types of golf balls in the market today, namely one-piece, two-piece and wound. One-piece golf balls are molded from a homogeneous mass of material, while two-piece golf balls are made by molding a cover about a solid core. Wound golf balls are made by molding a cover about a wound core. A wound core is prepared by winding thin elastic thread about a center.

Golf ball cores, whether wound or solid, typically measure from 1.4 to 1.6 inches (3.5 to 4.1 cm) in diameter. The cover is molded about the core to form a golf ball having the minimum United States Golf Association (USGA) specified diameter of 1.68 inches (4.3 cm).

Conventionally, both two-piece and wound golf balls are made by molding covers about cores in one of two ways: by injection molding of fluid cover stock material around a core which is held in a retractable pin mold; or by compression molding preformed half-shells about a core. The preformed half-shells are formed by injecting fluid cover stock material into half-shell molds and solidifying the cover stock material into a half-shell shape by cooling it.

Balata was the standard cover stock material until the middle 1960's when E.I. DuPont de Nemours and Co. discovered a new species of resins known as ionomers or ionomer resins. These resins are sold under the trademark SURLYN ® and, to a large extent, have replaced balata as a cover stock material. Chemically, Surlyn is a copolymer of an olefin and 5-15% by weight of the copolymer of an alpha, beta ethylenically unsaturated carboxylic acid with 10-90% of the carboxylic acid groups being neutralized by a metal ion, see U.S. Pat. No. 3,264,272. Today, the only commercially available ionomer resins are copolymers of ethylene and methacrylic or acrylic acid. Conventionally, these ionomer resins are distinguished by the type of metal ion, the amount of acid and the degree of neutralization.

Dunlop Rubber Company obtained the first patent on the use of Surlyn for the cover of a golf ball, see U.S. Pat. No. 3,454,280 issued July 8, 1969. Questor Corporation obtained U.S. Pat. No. 3,819,768, issued June 25, 1974, which include examples which show a blend of a sodium ionomer resin (sodium Surlyn) and a zinc ionomer resin (zinc Surlyn) as a cover for a golf ball.

In December of 1986, DuPont introduced a lithium ionomer resin, lithium Surlyn, which is a copolymer of ethylene and methacrylic acid, optionally containing a softening acrylate comonomer. DuPont suggested that lithium ionomer resins could be used to produce a golf ball cover which would be more cut resistant and harder than a cover made with either sodium or zinc ionomer resins. DuPont also suggested that a golf ball having a cover made from a lithium ionomer resin would go farther, have a higher coefficient of restitution and be less prone to cutting (i.e. more durable) than a golf ball made from other known ionomer resins, e.g. sodium and zinc ionomer resins and blends thereof. DuPont further suggested that lithium ionomer resins could be used in blends with other ionomer resins where they can impart better cut resistance to these other materials.

The clear import of the overall DuPont teaching is that while the lithium ionomer resins can be used to upgrade the properties of other ionomer resins, the lithium ionomer resins exhibit the best properties if they are used alone.

It has now been discovered that from about 10% to about 50% by weight of lithium ionomer resin in a golf ball cover can be replaced with sodium ionomer resin while still retaining the maximum properties of the cover. In fact, it has been found that a golf ball cover made from a blend of at least about 50 parts by weight based on 100 parts by weight resin (phr) of lithium ionomer resin and about 10 to about 50 phr of sodium ionomer resin has substantially similar properties to a golf ball cover made from an all lithium ionomer resin. Such a result was surprising because conventional thinking dictated that replacing a portion of the lithium ionomer resin with a sodium ionomer resin would result in a golf ball cover which would have a durability somewhere substantially below that of an all lithium ionomer resin golf ball cover. It was quite surprising that the blend of sodium and lithium ionomer resins could produce a cover that was as durable as a golf ball cover made from an all lithium ionomer resin.

Broadly, the present invention is an improved ionomer resin cover for a wound or two-piece golf ball, the improved ionomer resin cover comprising at least about 50 phr of lithium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by lithium; and about 10 to about 50 phr of sodium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by sodium.

Preferably, the golf ball cover of the present invention comprises about 60 to about 90 phr of said lithium ionomer resin and about 40 to about 10 phr of said sodium ionomer resin.

More preferably, a golf ball cover made in accordance with the present invention comprises about 60 to about 80 phr of said lithium ionomer resin and about 40 to about 20 phr of said sodium ionomer resin. Most preferably, the cover comprises about 70 phr of said lithium ionomer resin and about 30 phr of said sodium ionomer resin.

It has been found that the present invention is a particular advantage for a wound golf ball, i.e. one in which a wound core has a relatively thin cover. For a wound core, the cover preferably comprises about 60 to about 90 phr of said lithium ionomer resin and about 40 to about 10 phr of said sodium ionomer resin.

Preferably, the sodium ionomer resin content is made from two different sodium ionomer resins.

Both the lithium and sodium ionomer resins have about 10% to about 90% of their carboxylic acid groups neutralized by their respective metal ions. Preferably, the carboxylic acid groups have been neutralized about 35% to about 65% by the metal ion.

Preferably, both ionomer resins have the same monocarboxylic acid, e.g. either methacrylic or acrylic acid.

Good results have been obtained with a lithium ionomer resin sold under the trade name Surlyn 8118 by DuPont. Surlyn 8920 and Surlyn 8660, two sodium ionomer resins sold by DuPont, also work well in the present invention.

Surlyn 8118 has a melt flow index of about 2.6 g/10 min., while Surlyn 8920 and Surlyn 8660 have melt flow indexes of about 0.9 g/10 min. and about 1.0 g/10 min., respectively. Melt flow index is measured in accordance with ASTM Test D 1238, condition E, procedure A. Preferably, the blend of ionomer resins used to make a cover of a golf ball in accordance with the present invention has a melt flow index between about 1.0 to about 4.0 g/10 min. and, more preferably, about 1.0 to about 3.0 g/10 min.

The combined amount of lithium ionomer resin and sodium ionomer resin used to make a cover in accordance with the present invention as herein described generally makes up at least about 90% by weight of the total weight of the golf ball cover and, preferably, at least 95% by weight. Additional materials which may be included in the golf ball cover are other Surlyn resins; other resins, such as polybutadiene, polyurethane and polyisoprene; whitening agents such as titanium dioxide; dyes; UV absorbers; optical brighteners; and other additives which are conventionally included in golf ball covers.

The term "phr" as used in the specification and claims means parts by weight based on 100 parts by weight of resin.

Golf ball covers made in accordance with the present invention are made in a conventional manner by molding cover stock about a core. Molding is accomplished either by injection molding cove stock about a core or by compression molding preformed half-shells about a core. The preferred method is compression molding. Half-shells are made by injection molding a cover stock into a conventional half-shell mold in conventional manner at about 570° F (300° C) for about 40 seconds.

The preformed half-shells are then placed about a core and the assembly is introduced into a compression molding machine. The compression molding machine is a hydraulic press having an upper and lower mold plate. As taught by U.S. Pat. No. 4,508,309 issued Apr. 2, 1985, such mold plate has half molds each of which is registered with another half mold in the opposite mold plate. It has been found that a golf ball is formed with a cover in accordance with the present invention when the half-shells are compression molded about a core at about 300° F. (149° C.) for about 3 minutes. The molded balls are then cooled while still in the mold and finally removed when the cover is hard enough to be handled without deforming.

After the balls have been molded, they undergo various conventional finishing operations such as buffing, painting and stamping.

Preferably, the cover stock used to make a golf ball cover in accordance with the present invention is a blend of the lithium ionomer resin and the sodium ionomer resin in the amounts specified hereinabove. Blending of the ionomer resins is accomplished in a conventional manner using conventional equipment. Good results have been obtained by mixing the ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

These and other aspects of the present invention may be more fully understood by reference to the following examples.

EXAMPLE 1

This example illustrates making a golf ball having a wound core in accordance with the present invention. The following ingredients are mixed to make a cover stock:

TABLE 1

| Ingredients | Amounts (phr) |
| --- | --- |
| Surlyn 8118 (Li) | 70 |
| Surlyn 8920 (Na) | 20 |
| Surlyn 8660 (Na) | 10 |
| Titanium Dioxide | 5 |

The mixed cover stock is used to make half-shells in a conventional half-shell injection molding machine which heats the cover stock to 400° F. (204° C.) and injects the fluid cover stock into molds. This cover stock has a melt flow index of between about 2 and about 3. The half-shells are formed about the wound cores in a compression mold at 260° – 280° F. (127°–138° C.) for 10 minutes to yield a golf ball with a diameter of about 1.68 inches (4.3 cm) and a nominal cover thickness of about 0.06 inches (0.15 cm).

EXAMPLE 2

This example illustrates the durability of golf ball covers made in accordance with the present invention. Six different cover compositions were tested for cut resistance using a guillotine test. The results are reported in Table 2 below:

TABLE 2

| Ball No. | Cover Stock Resin | | | Guillotine Test Results-Height in Inches (cm.) |
| --- | --- | --- | --- | --- |
| | Dupont Code | Metal Ion | phr | |
| 1 | | Na | 100 | 22.3 (56.6) |
| 2 | | Na | 50 | 21.5 (54.6) |
|   |      | Zn | 50 |              |
| 3 | 8118 | Li | 70 | 24.6 (62.5) |
|   | 8920 | Na | 30 |              |
| 4 | 8118 | Li | 60 | 23.6 (59.9) |
|   | 8920 | Na | 40 |              |
| 5 | 8920 | Na | 20 | 24.8 (63.0) |
|   | 8660 | Na | 10 |              |
|   | 8118 | Li | 70 |              |
| 6 | 8118 | Li | 60 | 23.9 (60.7) |
|   | 8920 | Na | 30 |              |
|   | 8660 | Na | 10 |              |

Golf ball 1, except for the fact that this ball was not painted, was a commercial golf ball sold under the name Titleist DT by Acushnet Company of New Bedford, Mass. It was made in accordance with the procedure taught in Example 1. Similarly, golf balls 2-6 were made in the manner as described in Example 1. Golf balls 1-6 had production Titleist wound cores.

In the guillotine test, a knife edge of 8 pounds (3629 grams) was impacted against the golf ball from various heights under the force of gravity. Cut resistance was determined by the maximum height to which the knife blade could be raised without cutting the cover of the golf ball on impact. A cut was defined as penetration completely through the cover; a mere crease in the golf ball was not considered to be a cut for testing purposes.

The higher the blade had to be raised to cut the cover, the more cut resistant the golf ball was.

EXAMPLE 3

The performance of golf balls 3-6 of Example 2 above was compared to the performance of conventional golf ball 1 by measuring their initial velocities.

The golf balls of the present invention, golf balls 3-6, were found to have initial velocities comparable to the initial velocity of conventional golf ball 1, about 252 ft./second.

EXAMPLE 4

This example illustrates the durability of golf ball covers made in accordance with the present invention as compared to a cover made from lithium ionomer resin alone. Using the guillotine test of Example 2 above, painted golf balls were tested and the following results were recorded:

TABLE 4

| Ball No. | Cover Stock Resin | | | Guillotine Test Results-Height in Inches (cm.) |
| --- | --- | --- | --- | --- |
| | Dupont Code | Metal Ion | phr | |
| 7 | | Na | 100 | 31 (78.7) |
| 8 | 8110 | Li | 100 | 34 (86.4) |
| 9 | 8920 | Na | 50 | 35 (88.9) |
| | 8118 | Li | 50 | |
| 10 | 9910 | Na | 50 | 35 (88.9) |
| | 8118 | Li | 50 | |

Golf ball 7 was a commercial golf ball sold under the Pinnacle by Acushnet Company and golf balls 8, 9, 10 were made in accordance with Example 1. Golf balls 7-10 had one-piece, solid cores and painted covers.

It will be understood that each and every numerical value which appears in the claims herein is modified by the term "about" if the modifying term "about" does not appear in front of such numerical value.

It will be understood that the claims are intended to cover all changes and modifications of the preferred embodiments of the invention, herein chosen for the purpose of illustration, which do not constitute a departure from the spirit and scope of the invention.

What is claimed is:

1. In a golf ball having an ionomer resin cover the improvement comprising said ionomer resin cover comprising at least about 50 phr of lithium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by lithium; and about 10 to about 50 phr of sodium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by sodium.

2. The golf ball of claim 1 wherein said lithium ionomer resin is present in an amount of at least about 60 phr.

3. The golf ball of claim 2 wherein said ionomer resin cover comprises about 60 to about 90 phr of said lithium ionomer resin and about 10 to about 40 phr of said sodium ionomer resin.

4. The golf ball of claim 3 wherein said sodium ionomer resin is two sodium ionomer resins each having a different melt flow index.

5. The golf ball of claim 3 wherein at least about 90% by weight of said ionomer resin cover is said lithium ionomer resin and said sodium ionomer resin and wherein up to about 10% by weight of said cover comprises one or more additional ingredients selected from the group consisting of other ionomers, other resins, titanium dioxide, dyes, UV absorbers and optical brighteners.

6. The golf ball of claim 3 wherein said ionomer resin cover is made by blending said lithium ionomer resin and said sodium ionomer resin to produce a blend of ionomer resins having a melt flow index of about 1.0 to about 4.0 g/10 min.

7. In a golf ball comprising a core and a cover, the improvement comprising:
   (a) at least about 90% by weight of said cover being made from a blend of ionomer resins, said blend comprising:
      (i) at least about 50 phr of a lithium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by lithium; and
      (ii) about 10 to about 50 phr of a sodium ionomer resin which is a copolymer comprising 95 to 80 parts by weight of copolymer of ethylene and 5 to 20 parts by weight of the copolymer of acrylic or methacrylic acid in which about 10% to about 90% of the acid groups are neutralized by sodium; and
   (b) up to about 10% by weight of said cover comprising one or more additional ingredients selected from the group consisting of other ionomers, other resins, titanium dioxide, dyes, UV absorbers and optical brighteners.

8. The golf ball of claim 7 wherein the core is a solid core.

9. The golf ball of claim 7 wherein said core is a wound core and said lithium ionomer resin is present in an amount between about 60 and about 90 phr.

10. The golf ball of claim 7 wherein said sodium ionomer resin comprises a first sodium ionomer resin and a second sodium ionomer, said first sodium ionomer resin having a melt flow index of about 0.9 g/10 min. and said second sodium ionomer resin having a melt flow index of about 1.0 g/10 min.

11. The golf ball of claim 7 wherein said blend has a melt flow index of about 1.0 to about 4.0 g/10 min.

12. The golf ball of claim 1 wherein said lithium ionomer resin is present in an amount of about 60 to about 90 phr and said golf ball has a wound core.

13. The golf ball of claim 7 wherein said sodium ionomer resin comprises two sodium ionomer resins each having a different melt flow index.

14. The golf ball of claim 1 wherein said lithium ionomer resin is present in said ionomer cover in an amount of about 60 to about 80 phr and said sodium ionomer resin is present in said ionomer cover in an amount of about 40 to about 20 phr.

15. The golf ball of claim 7 wherein said lithium ionomer resin is present in an amount of about 60 to about 80 phr and said sodium ionomer resin is present in an amount of about 40 to about 20 phr.

16. The golf ball of claim 4 wherein said golf ball has a solid core and said lithium ionomer resin and said two sodium ionomer resins are blended to have a melt flow index of about 1.0 to about 3.0 g/10 min.

17. The golf ball of claim 10 wherein said golf ball has a solid core and said blend of said lithium ionomer resin and said first and second sodium ionomer resins has a melt flow index of about 1.0 to about 3.0 g/10 min.

* * * * *

UNITED STATES PATENT AND TRADEMARK OFFICE
CERTIFICATE OF CORRECTION

PATENT NO.   : 5,000,459
DATED        : March 19, 1991
INVENTOR(S)  : Sharon R. Isaac It is certified that error appears in the above-identified patent and that said Letters Patent is hereby corrected as shown below:

Column 1, line 51, change "include" to --includes--.

Column 3, line 32, change "cove" to --cover--.

Column 5, line 30, before "Pinnacle" insert --name--.

Column 6, line 40, after "second sodium ionomer" insert --resin--.

Column 6, line 52, after "said ionomer" insert --resin--.

Column 6, line 54, after "said ionomer" insert --resin--.

Signed and Sealed this

Eighth Day of September, 1992

Attest:

DOUGLAS B. COMER

*Attesting Officer*  *Acting Commissioner of Patents and Trademarks*